United States Patent [19]
Journee

[11] Patent Number: 5,289,607
[45] Date of Patent: Mar. 1, 1994

[54] MOTOR VEHICLE SCREEN WIPING APPARATUS INCLUDING MEANS FOR VARYING WIPING PRESSURE

[75] Inventor: Maurice Journee, Reilly, France
[73] Assignee: Paul Journee S.A., Colombes, France
[21] Appl. No.: 17,383
[22] Filed: Feb. 12, 1993

[30] Foreign Application Priority Data

Feb. 12, 1992 [FR] France ................ 92 01569

[51] Int. Cl.⁵ .............................................. B60S 1/32
[52] U.S. Cl. .............................. 15/250.20; 15/250.35
[58] Field of Search ........... 15/250.20, 250.19, 250.35, 15/250.34, 250.33, 250.30

[56] References Cited

U.S. PATENT DOCUMENTS

| | | | |
|---|---|---|---|
| 2,784,438 | 3/1957 | Peterson | 15/250.19 |
| 4,718,139 | 1/1988 | Okuda et al. | 15/250.20 |
| 5,129,123 | 7/1992 | Shirato | 15/250.20 |

FOREIGN PATENT DOCUMENTS

| | | | |
|---|---|---|---|
| 1938618 | 2/1971 | Fed. Rep. of Germany. | |
| 3444927 | 7/1986 | Fed. Rep. of Germany | 15/250.20 |
| 61-125952 | 6/1986 | Japan. | |
| 4087862 | 3/1992 | Japan | 15/250.20 |
| 2180442 | 9/1986 | United Kingdom. | |

*Primary Examiner*—Stephen F. Gerrity
*Assistant Examiner*—Gary K. Graham
*Attorney, Agent, or Firm*—Morgan & Finnegan

[57] ABSTRACT

A screen wiping apparatus, for example for a motor vehicle windscreen, comprises a wiper arm which is articulated about a pivot axis on a drive head, with means being arranged between the drive head and the wiper arm so as to apply a wiping torque to the latter. These torque-applying means comprise at least one spring which applies to the arm a substantially constant nominal wiping torque, together with an actuator for applying a complementary torque. The actuator comprises a body associated with the drive head, together with an output ram sliding in the body and coupled to the wiper arm. The output member of the actuator is coupled to the wiper arm by means of a coupling member which is displaced in a direction at right angles to the pivot axis, and which has a working surface which cooperates with a roller rotatably mounted about a fixed axis of the wiper arm parallel to the pivot axis.

11 Claims, 4 Drawing Sheets

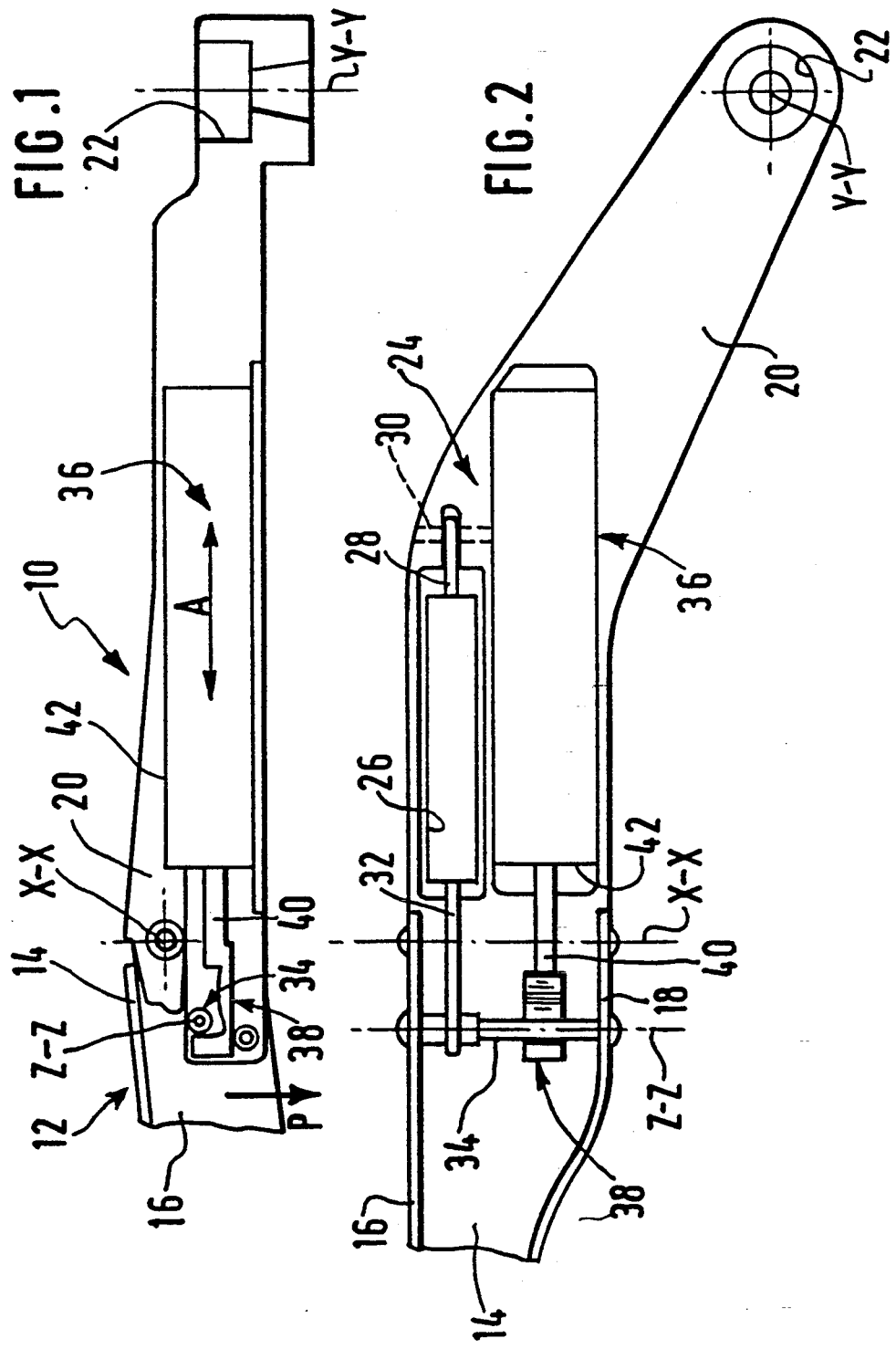

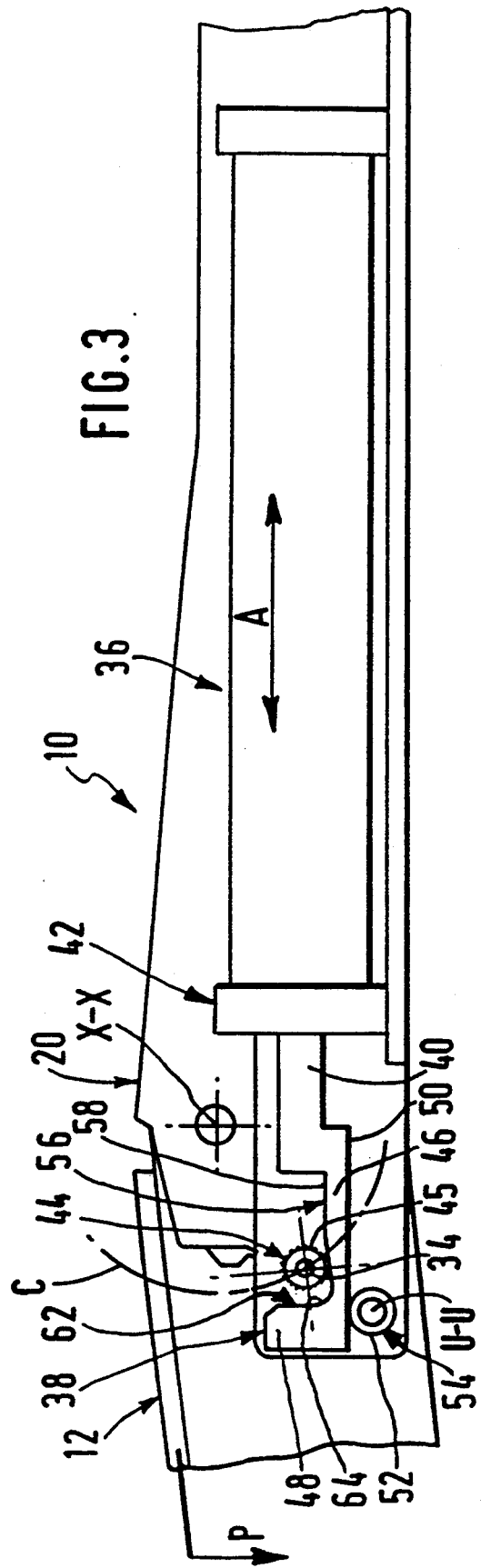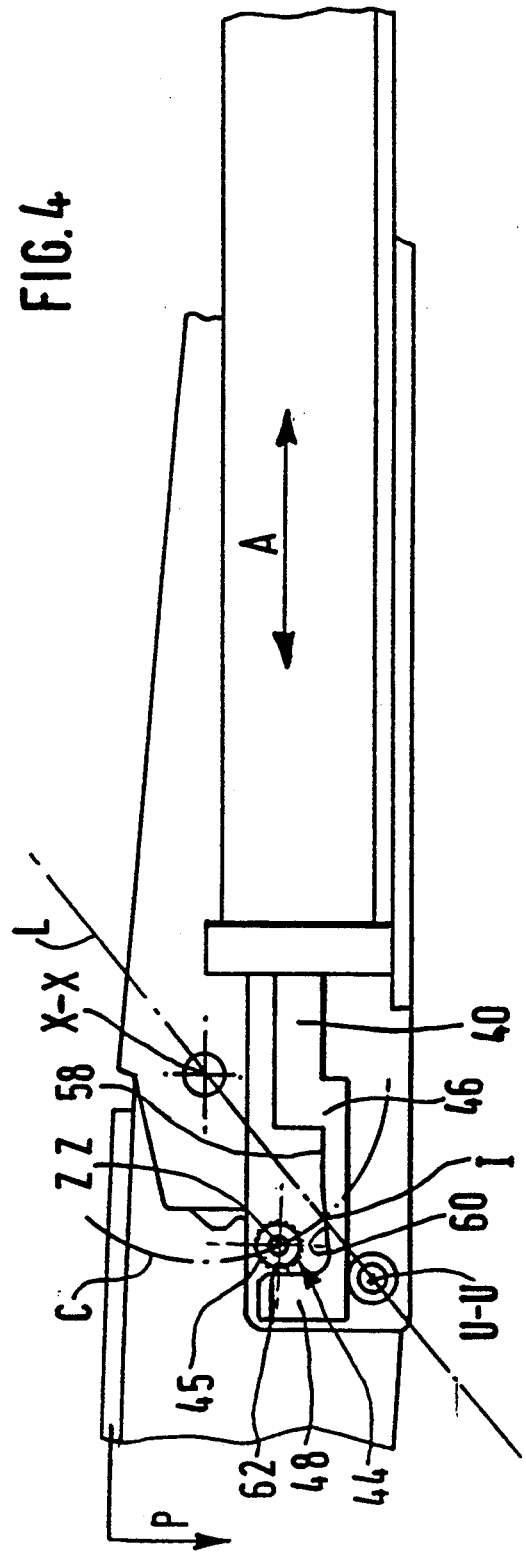

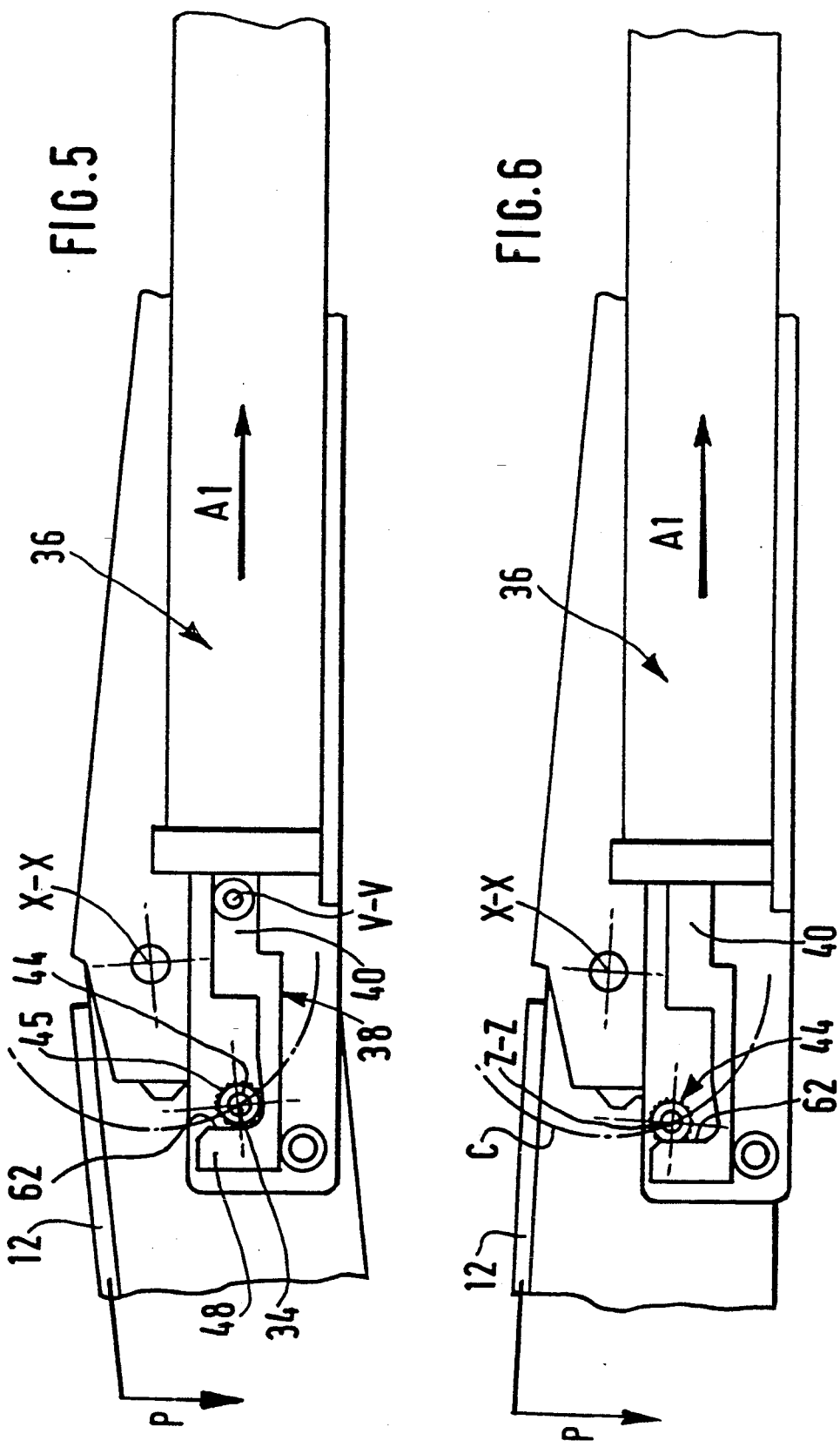

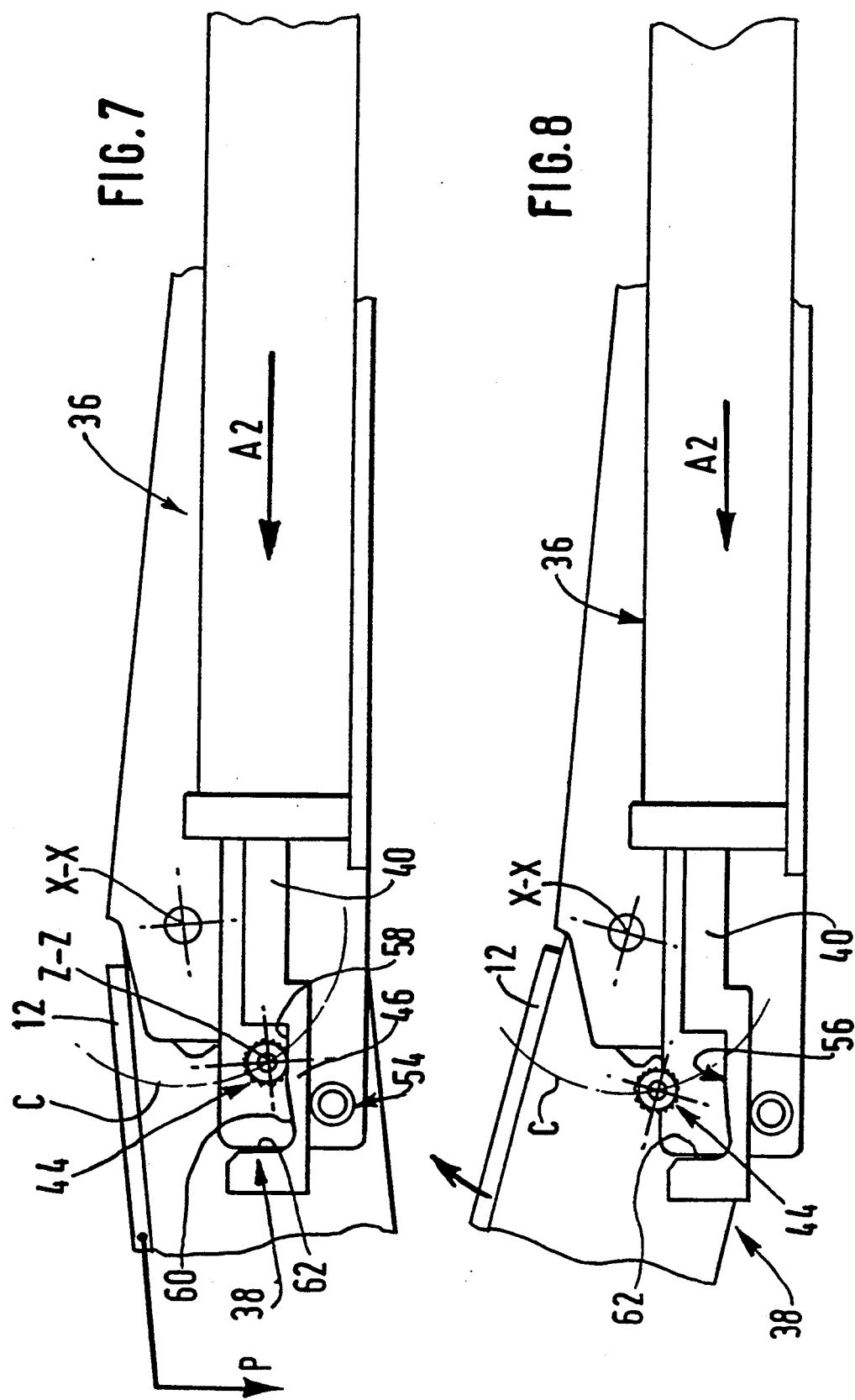

MOTOR VEHICLE SCREEN WIPING APPARATUS INCLUDING MEANS FOR VARYING WIPING PRESSURE

FIELD OF THE INVENTION

The present invention relates to screen wiping apparatus, especially for motor vehicles. The term "screen wiping apparatus" here means apparatus for wiping or sweeping a glass surface, such as the windshield of a vehicle.

More particularly, the invention is concerned with a screen wiping apparatus of the type which comprises at least one wiper arm carrying at least one wiper blade, for example through a blade carrier having stirrups, and which is mounted on a drive head of the wiper on which it is articulated about a pivot axis, the drive head being moved in alternating rotary motion by a drive spindle whereby to effect the wiping operation on the glass to be swept.

BACKGROUND OF THE INVENTION

The wiper arm carries, via the blade carrier, an articulated wiper blade which sweeps over the glass (or swept) surface, which may for example be a windshield of the motor vehicle. In order to obtain correct wiping of the glass surface, it is necessary that the wiping strip of the blade should be applied on the swept surface with a substantial pressing or wiping force.

To this end, at least one spring is usually provided, for example a helical tension spring which is disposed between the drive head and the remainder of the wiper arm, and which in practice applies a substantially constant nominal wiping torque to the wiper arm about its pivot axis, in such a way as to cause the wiping strip to be forced firmly against the glass. The design of such an arrangement is such that the wiping strip is forced against the swept surface not only during the wiping movement itself but also in the rest or parking position of the wiping apparatus. Since the nominal wiping force applied to the wiping strip is permanent, even while the apparatus is at rest, it is found that the wiping strip retains a residual shape which results from the distortion of its profile against the swept surface. This results in the strip eventually ceasing to wipe the swept surface efficiently enough. It is therefore desirable to be able to reduce the nominal wiping force applied to the wiping strip while the apparatus is parked.

In addition, the quality of wiping of the swept surface depends in operation on the magnitude of the wiping force which is applied to the strip, and this is especially dependent on the speed of movement of the vehicle and the frequency of the wiping movement of the apparatus itself.

It is also known to increase the wiping force by means of aerodynamic attachments which are mounted on the wiper arm. However, these arrangements do not enable the value of the wiping force to be controlled with any precision. In particular, they do not enable the force to be adjusted in a controlled manner in accordance with an operating parameter of the vehicle.

In order to overcome the drawbacks mentioned above, it has already been proposed to provide a screen wiping apparatus of the general type mentioned above, in which the means which are arranged between the drive head and the wiper arm in order to apply a wiping torque to the latter comprise at least one spring, together with a device for applying a complementary couple to the arm. The spring applies a substantially constant nominal wiping torque to the wiper arm, while the algebraic value of the complementary torque applied by the said device can, in particular, be adjusted in such a way that the value of the wiping torque can be increased or reduced as a function of at least one operating parameter of the vehicle.

The complementary torque-applying device comprises, for example, an actuator which is associated with the drive head, and which has an output ram coupled to the wiper arm.

DISCUSSION OF THE INVENTION

An object of the invention is to propose an improved screen wiping apparatus, the design of which is such that, in particular, the algebraic value of the complementary torque applied to the wiper arm can be precisely controlled, both during operation of the wiper and when the latter is in its parked position.

To this end, according to the invention, screen wiping apparatus, in particular for a motor vehicle, of the type comprising a screen wiper arm which carries at least one wiper blade and which is articulated, about a pivot axis, on a drive head of the wiper arm, and means arranged between the drive head and the wiper arm for applying a wiping torque to the latter, the said means comprising at least one spring which applies to the wiper arm a substantially constant nominal wiping torque, together with a complementary torque-applying device which comprises an actuator, the body of which is associated with the drive head, with the output member of the said actuator being coupled to the wiper arm, is characterised in that the output member of the actuator is coupled to the wiper arm by means of a coupling member which is displaced in a direction at right angles to the pivot axis, the coupling member having a working surface which cooperates with a roller for applying the complementary torque, the roller being rotatably mounted about a fixed axis of the screen wiper arm parallel to the pivot axis.

Among preferred features of the invention are the following:

the coupling member comprises two branches and is L-shaped, and the roller is arranged to cooperate with the inner faces of the two branches of the coupling member;

a first branch of the coupling member extends in the said direction of displacement;

the inner face of the second branch of the coupling member is a flat surface portion at right angles to the direction of displacement;

the inner face of the first branch of the coupling member comprises a ramp which is inclined with respect to the direction of displacement;

the outer face of the first branch of the coupling member is parallel to the direction of displacement and cooperates with an application disc which is rotatably mounted about an axis of rotation at right angles to the direction of displacement;

the geometric arc of a circle, on which the axis of rotation of the roller lies, intercepts the straight line which passes through the pivot axis and the axis of rotation of the application disc at a point lying between these two axes;

the outer cylindrical surface of the roller is made of a resiliently deformable material;

the inner face of the second branch of the coupling member is directed towards the actuator;

the actuator is a linear motor which includes an output ram sliding axially and having the coupling member connected to its outer end;

the coupling member is articulated on the actuator ram about an axis at right angles to the direction of displacement.

Further features and advantages of the invention will appear more clearly from the detailed description of a preferred embodiment of the invention which follows, and which is given by way of example only and with reference to the accompanying drawings.

BRIEF DESCRIPTION OF THE DRAWINGS

FIG. 1 is a diagrammatic view in transverse cross section, showing part of a screen wiping apparatus in accordance with the invention;

FIG. 2 is a top plan view, partly cut away, of the apparatus shown in FIG. 1.

FIGS. 3 to 8 are views on a larger scale, similar to those in FIG. 1 but showing various different relative positions of the components of the screen wiper, corresponding in particular to various phases in its operation.

DESCRIPTION OF A PREFERRED EMBODIMENT OF THE INVENTION

The screen wiping apparatus 10 shown in FIGS. 1 and 2 includes a screen wiper arm 12 constituting a blade carrier, of which the portion shown in the drawings is in the form of a hollow channeled section, of inverted U-shape comprising a back portion 14 and two flanks or lateral portions 16 and 18, with these latter extending at right angles to the back portion 14. The screen wiper arm 12 is articulated on a drive head 20 about a geometric axis X-X which extends in a direction substantially at right angles to the general direction of the screen wiper arm.

The drive head 20 includes, at its end remote from the pivot axis X-X, a bore 22, the axis Y-Y of which is substantially at right angles to the pivot axis. The purpose of the bore 22 is to receive the usual drive spindle (not shown) whereby the drive head 20 is drive in alternating rotary motion, by any suitable means such as, typically, a screen wiper drive motor (not shown).

In a known way, the screen wiper apparatus 10 includes means for applying to the wiper arm 12 a wiping pressure P, of substantially constant value and oriented towards the surface to be swept (not shown). In this example, the means 24 comprises a helical tension spring 26, one end 28 of which is hooked on to a transverse pin 30 of the drive head 20. The other end 32 of the spring 26 is hooked on to another transverse pin 34, which is carried by the wiper arm 12. The geometric axis Z-Z of this pin 34 is parallel to the pivot axis X-X. As can be seen in FIG. 1, the axis Z-Z lies below the axis X-X, that is to say between the latter and the swept surface, in such a way that the spring 26 applies a nominal torque to the wiper arm 12 about its axis X-X, so that the wiping pressure P is applied to the wiping strip of the screen wiper blade carried by the arm 12.

The screen wiper apparatus 10 also includes means for applying to the wiper arm 12 a complementary torque which enables the value of the wiping pressure P to be varied. Essentially, these means comprise an actuator 36 which is arranged in the drive head 20, together with a coupling member 38 which connects the actuating or output ram 40 of the actuator 36 to the wiper arm 12.

In the embodiment shown in the drawings, the actuator 36 is of the linear type, and its general direction A of operation extends in a direction which is substantially at right angles to the pivot axis X-X between the arm 12 and the drive head 20. The ram 40 of the actuator 36 projects parallel to the direction A, beyond the body 42 of the actuator 36.

As can best be seen in FIGS. 3 to 8, the coupling member 38 cooperates with a roller 44 which is mounted for rotation on the pin 34. The body of the roller 44 is made for example of a resiliently deformable material, and its purpose is to cooperate with working surfaces of the coupling member 38, which will be described in greater detail below.

The coupling member 38 is generally L-shaped, comprising a first branch 46 and a substantially perpendicular second branch 48. The first branch 46 extends in a direction parallel to the working direction, or direction of displacement, A, and therefore in a direction at right angles to the pivot axis X-X. The first branch 46 has a flat outer surface 50 which extends parallel to the working direction A and which is guided in its displacements in engagement on the outer cylindrical surface 52 of an application disc 54. The disc 54 is mounted for rotation around a support pin having a fixed axis U-U and carried by the drive head 20.

The inner face 56 of the first branch 46 constitutes a first working surface portion with which the roller 44 can cooperate to apply the complementary torque. The inner surface 56 comprises a first part 58 which is parallel to the outer face 50, together with a second part 60 which defines an inclined ramp, as is best seen in FIG. 4. The inclination of the ramp 60 is such that the thickness of the first branch 46 reduces in a direction going away from the actuator and towards the second branch 48. The inner face 62 of the second branch 48 faces towards the actuator 36, and is part of a plane surface which extends in a plane at right angles to the working direction A and parallel to the pivot axis X-X.

This second working surface portion 62 is joined to the first portion 56 through an inwardly curved surface portion 64, the radius of which corresponds substantially to the outer radius of the roller 44.

When the screen wiper arm pivots about its pivot axis X-X, the axis of rotation Z-Z of the roller 44 is displaced through an arc C of a circle. The straight line L passing through the pivot axis X-X and through the axis of rotation U-U of the application disc 52 intersects the arc C at a point I, which is always situated between these two geometric axes.

The operation of the device for applying the complementary torque which has just been described will now itself be described with reference to FIGS. 3 to 8. The position shown in FIG. 3 is the normal operating position of the screen wiper apparatus 10 during a wiping operation on a windshield. In this position, the value of the wiping pressure P depends on the characteristics of the spring 26, and therefore corresponds substantially to the nominal wiping pressure. Here, the outer surface 45 of the roller 44 is not in contact with the second working surface portion 62, but it is in simple contact with the middle part of the ramp 60, and a complementary torque is not applied to the windshield wiper arm 12.

During the wiping operation on the windshield, and according to the curvature of the latter, the windshield wiper 12 can pivot about the axis X-X, so as to attain, for example, the position shown in FIG. 4, in which the value of the wiping pressure P has not varied. In effect, it is found that the outer surface 45 of the roller 44 is spaced away from the ramp 60 and is not always in contact with the working surface portion 62.

In the position shown in FIG. 5, the ram 40 has been displaced in the working direction A1, so as to bring the working surface portion 62 into contact with the surface 45 of the roller 44, thus exerting on the latter (and therefore on the pin 34) an additional force which gives rise to an increase in the wiping torque, and therefore also to an increase in the wiping pressure P.

If the screen wiper arm 12 pivots about its pivot axis X-X in the clockwise direction (with reference to FIG. 5), and due to the displacement of the axis of rotation Z-Z along the arc C, a supplementary increase occurs in the complementary torque applied by the actuator 36. It is therefore found that the cooperation of the roller 44 with the working surface portion 62 of the second branch 48 enables a complementary torque to be applied to the wiper arm 12. The value of this complementary torque increases when the wiper arm 12 oscillates about the axis X-X, so as to pass from the lower wiping position seen in FIG. 5 to the upper wiping position seen in FIG. 6.

Referring now to FIG. 7, this shows the screen wiping apparatus in its rest position, more commonly known as the parked position. In this position the ram 40 of the actuator 36 has been displaced in the direction A2, that is to say from right to left in FIG. 7. This displacement has caused the roller 44 to cooperate with the ramp 60 so as to bring it into contact with the first portion 58 of the working surface 56. This displacement of the roller with respect to the coupling member 38, the first branch 46 of which is in engagement on the reaction or application disc 54, causes a complementary torque to be applied to the wiper arm 12. The value of this complementary torque is of opposite sign to that of the nominal torque, so that it is subtracted from the latter, thus significantly reducing the value of the wiping pressure P, for example by one half of the nominal value.

By departing from the rest position shown in FIG. 7, and especially if it is desired to work on the windshield wiper 12 for maintenance purposes, it can be pivoted in the clockwise direction about the pivot axis X-X so as to bring it into the position shown in FIG. 8. Because of the L-shaped design of the coupling member 38, there is nothing to oppose this pivoting action of the wiper arm 12 through a very large angle about the axis X-X. When the maintenance operation is completed, the user returns the wiper arm 12 into its position shown in FIG. 7, towards which it is elastically biassed by the spring 26.

The design of the apparatus which has just been described thus enables the value of the wiping pressure to be varied as a function, in particular, of operating parameters of the motor vehicle.

Whatever the axial position of the actuator ram 40 with respect to the body of the actuator 46, and in the event of failure of the actuator, the screen wiper retains a minimal ability to operate and thus to wiper the glass surface with, in the worst case, a wiping pressure which is at least equal to the residual value of this pressure in the parked position shown in FIG. 7.

The fact that the body of the roller 44 is made of a resiliently deformable material also prevents the transmission, to the actuator ram 40 and to the actuator 36 in general, of the variations in force to which the arm 12 is subjected and which result from the wiping of a curved surface.

Referring to FIG. 5, this shows a variant in which it is also possible to arrange that the coupling member 38 is articulated on the actuator ram 40, being pivoted about an axis V-V at right angles to the displacement direction A-A, thus also preventing application to the actuator ram 40 of forces tending to urge it in a transverse direction to an excessive degree.

Without departing from the spirit of the present invention, it is possible to provide numerous variants in the apparatus which has been described in detail above. The configuration of the working surface portions with which the roller 44 cooperates can, in particular, be varied very greatly, and their shape may in particular be that of a cam, with the profile of this cam determining both the value of the complementary force which is applied to the wiper arm 12, and the variations in this value as a function of the relative positions of the components.

What is claimed is:

1. A screen wiping apparatus comprising: a drive head having a pivot axis; a wiper arm for carrying at least one wiper blade, said wiper arm pivotally mounted on the drive head for movement with respect to the drive head about the pivot axis; and wiping torque-applying means coupled between the drive head and the wiper arm for applying a wiping torque to the wiper arm, the wiping torque applying means having a substantially constant torque-applying means which includes at least one spring coupled to the wiper arm and drive head for applying to the wiper arm a substantially constant nominal wiping torque; and said torque-applying means further including complementary torque-applying means for applying a complementary torque, said complementary torque applying means having an actuator, the actuator having an actuator body and an output member movable in the actuator body, the actuator body being mounted on the drive head and the output member being connected to the wiper arm, the complementary torque applying means further having a coupling member coupling the wiper to the output member of the actuator; said output member mounting the coupling member for movement therewith in a direction of displacement at right angles to the pivot axis, the coupling member having a working surface, the wiper arm carrying an elongated pin that has an axis parallel to the pivot axis, and the apparatus further including a roller rotatably mounted on the wiper arm pin for rotation about the wiper arm pin axis and for engagement with the working surface of the coupling member whereby movement of the coupling member varies the magnitude of the complementary torque.

2. Apparatus according to claim 1, wherein coupling member is L-shaped to define two branches, each of the respective branches itself having an inner face, the roller selectively engaging the inner faces of the two branches.

3. Apparatus according to claim 2, wherein one of the branches extends in the direction of output member displacement.

4. Apparatus according to claim 3, wherein the inner face of the other of the two branches of the coupling member has a flat surface portion perpendicular to the direction of output member displacement.

5. Apparatus according to claim 3, wherein the inner face of the one branch of the coupling member has a ramp which is inclined to the direction of output member displacement.

6. Apparatus according to claim 5, wherein the one branch of the coupling member has an outer surface parallel to the direction of output member displacement, the apparatus further including an application disc and means mounting the application disc on the drive head to establish an axis of application disc rotation at right angles to the direction of output member displacement for rotation of the application disc about the axis of application disc rotation, the application disc engaging the outer face of the one branch.

7. Apparatus according to claim 6, wherein the axis of rotation of the roller lies on an arc of a circle, the axis of rotation of the application disc and the pivot axis together defining a straight line which intersects the roller axis of rotation arc at a point lying between the pivot axis and the axis of rotation of the application disc.

8. Apparatus according to claim 2, wherein the inner face of the other branch of the coupling member is directed towards the actuator.

9. Apparatus according to claim 1, wherein the roller has a resiliently deformable outer cylindrical surface.

10. Apparatus according to claim 1, wherein the actuator is a linear actuator, the output member of the actuator having an axially slidable ram with a free end thereof, the free end of the ram being coupled to the coupling member.

11. Apparatus according to claim 10, wherein the coupling member engages the ram at right angles to the direction of ram displacement.

* * * * *